US012656219B2

(12) United States Patent
Wang et al.

(10) Patent No.: US 12,656,219 B2
(45) Date of Patent: Jun. 16, 2026

(54) APPARATUS AND METHOD FOR MEASURING CHIRP IN FIBER OPTICAL TRANSMITTERS

(71) Applicant: Google LLC, Mountain View, CA (US)

(72) Inventors: Liming Wang, San Jose, CA (US); Xiang Zhou, Sunnyvale, CA (US); Cedric Fung Lam, San Carlos, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 18/218,411

(22) Filed: Jul. 5, 2023

(65) Prior Publication Data

US 2025/0012664 A1     Jan. 9, 2025

(51) Int. Cl.
G01M 11/00     (2006.01)

(52) U.S. Cl.
CPC .................................. G01M 11/33 (2013.01)

(58) Field of Classification Search
CPC ...... G01M 11/33; H04B 10/516; Y02P 90/02; Y02P 90/30
USPC ........................................................ 356/73.1
See application file for complete search history.

(56) References Cited

U.S. PATENT DOCUMENTS

| | | | |
|---|---|---|---|
| 6,178,001 | B1 | 1/2001 | Kim |
| 6,958,467 | B2 | 10/2005 | Inui et al. |
| 2008/0205884 | A1 | 8/2008 | Maestle |
| 2011/0158640 | A1 | 6/2011 | Izumi |

FOREIGN PATENT DOCUMENTS

| | | | | | |
|---|---|---|---|---|---|
| CN | 103234735 | A | 8/2013 | | |
| EP | 1030472 | A2 | 8/2000 | | |
| EP | 1309115 | A2 | 5/2003 | | |
| JP | H1198074 | A | * 4/1999 | | |
| JP | H11251973 | A | * 9/1999 | | |
| KR | 101343461 | B1 | * 12/2013 | ......... | H01S 5/06821 |
| WO | 2022000338 | A1 | 1/2022 | | |
| WO | WO-2022095168 | A1 | * 5/2022 | .......... | H01S 5/0057 |

OTHER PUBLICATIONS

Extended European Search Report for European Patent Application No. 24186851.2 dated Nov. 19, 2024. 10 pages.

(Continued)

*Primary Examiner* — Sunghee Y Gray
(74) *Attorney, Agent, or Firm* — Lerner David LLP

(57) ABSTRACT

Methods and apparatus for monitoring chirp in a modulated light beam. The modulated light is passed through a variable dispersion element or "VDE", and the light from the variable dispersion element is detected to yield a signal. A parameter which represents the strength of modulation in the light after passage through the VDE such as the peak intensity of the modulated light is measured as the VDE is controlled to vary the applied dispersion. The chip is determined from the variation of the parameter with dispersion, such as from the dispersions at which the parameter is at minima. The method can be applied to beams modulated by common digital transmitters used in optical communication systems.

5 Claims, 11 Drawing Sheets

(56)          References Cited

OTHER PUBLICATIONS

Devaux F et al: "Simple Measurement of Fiber Dispersion and of Chirp Parameter of H04B Intensity Modulated Light Emitter", Journal of Lightwave Technology, IEEE, USA, vol. 11, No. 12, Dec. 1, 1993 (Dec. 1, 1993), pp. 1937-1940, XP000422652, ISSN: 0733-8724, DOI: 10.1109/50.257953.

Hoon Kim and Alan H. Gnauck, "Chirp Characteristics of Dual-Drive Mach-Zehnder Modulator With a Finite DC Extinction Ratio," IEEE Photonics Technology Letters, vol. 14, No. 3, pp. 298-300, Mar. 2002.

J.-G. Provost and F. Grillot, "Measuring the Chirp and the Linewidth Enhancement Factor of Optoelectronic Devices with a Mach-Zehnder Interferometer," in IEEE Photonics Journal, vol. 3, No. 3, pp. 476-488, Jun. 2011, doi: 10.1109/JPHOT.2011.2148194.

R. C. Srinivasan and J. C. Cartledge, "On using fiber transfer functions to characterize laser chirp and fiber dispersion," In IEEE Photonics Technology Letters, vol. 7, No. 11, pp. 1327-1329, Nov. 1995, doi: 10.1109/68.473487 [abstract].

TeraXion ClearSpectrum TDCMB Tunable Dispersion Compensation Module—Benchtop <https://teraxion.blob.core.windows.net/ media/1596/mkt-ftech-cs-tdcmb-data-sheet-cs-tdcmb-41-_en.pdf> (2021).

C. Laverdiere, A. Fekecs and M. Tetu, "A new method for measuring time resolved frequency chirp of high bit rate sources," in IEEE Photonics Technology Letters, vol. 15, No. 3, pp. 446-448, Mar. 2003, doi: 10.1109/PT.2002.807954 [abstract].

B. Kowalski, J. Debeau and R. Boittin, "A simple and novel method for measuring the chirp parameter of an intensity modulated light source," in IEEE Photonics Technology Letters, vol. 11, No. 6, pp. 700-702, Jun. 1999, doi: 10.1109/68.766790 [abstract].

A. Villafranca, J. Lasobras and I. Garces, "Precise characterization of the frequency chirp in directly modulated DFB lasers," 2007 Spanish Conference on Electron Devices, Madrid, Spain, 2007, pp. 173-176, doi: 10.1109/SCED.2007.384020 [abstract].

F. Devaux, Y. Sorel and J. F. Kerdiles, "Simple measurement of fiber dispersion and of chirp parameter of intensity modulated light emitter," in Journal of Lightwave Technology, vol. 11, No. 12, pp. 1937-1940, Dec. 1993, doi: 10.1109/50.257953 [abstract].

200G Mz based chirp measurements plans (May 2023).

T. Inui et al. "Bit rate flexible chirp measurement technique using two-photon absorption," Electronics Letters Nov. 7, 2002 vol. 38 No. 23.

* cited by examiner

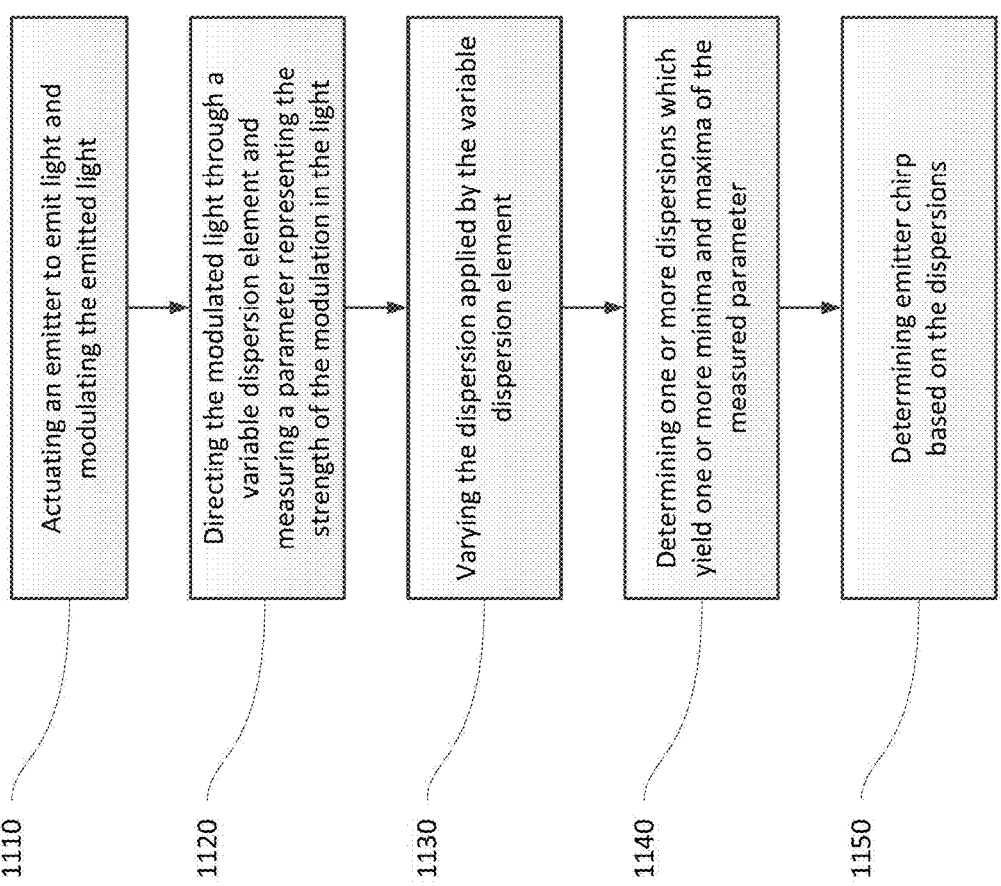

1110 Actuating an emitter to emit light and modulating the emitted light

1120 Directing the modulated light through a variable dispersion element and measuring a parameter representing the strength of the modulation in the light 1130 Varying the dispersion applied by the variable dispersion element 1140 Determining one or more dispersions which yield one or more minima and maxima of the measured parameter 1150 Determining emitter chirp based on the dispersions

FIG.11

APPARATUS AND METHOD FOR MEASURING CHIRP IN FIBER OPTICAL TRANSMITTERS

Optical communication systems are used to send information, most typically in digital form. For example, optical communications systems are used to transfer data between computers in data centers used for cloud computing. A typical optical communication system includes a transmitter, which includes an emitter and modulator. The emitter and modulator may include an emitter such as a diode or laser which can be controlled internally to modulate the light output in accordance with a drive signal applied to the emitter. Alternatively, the emitter and modulator may include an emitter arranged to emit a constant beam of light and a separate modulating device as, for example, an electro-absorption modulator or electro-optic modulator for varying one or more properties of the emitted light, such as the amplitude or phase of the light. The transmitter further includes a translation circuit for receiving data in electronic digital form and controlling the emitter and modulator to emit light modulated according to the data.

One form of modulation commonly used in optical communication systems is referred to as pulse amplitude modulation or "PAM". In pulse amplitude modulation, the light is modulated to one of several discrete amplitudes during successive brief intervals. The duration of each interval may be on the order of tenths or hundredths of a nanosecond. For example, in "4-PAM" modulation, four discrete amplitudes are employed; the amplitude during each interval represents two bits of digital information. The communication system further includes an optic fiber connected to receive the light output from the emitter and modulator of the transmitter. A receiver includes a photodetector connected to receive light from the optic fiber and produce an electrical signal representing the light. A signal processing circuit receives the electrical signal from the photodetector and converts the signal back to the digital data represented by the signal. For example, where the transmitter uses PAM, the signal processing circuit may determine the amplitude of the electrical signal during each interval.

The optic fiber typically is a "single-mode" fiber, adapted to conduct the light from the emitter and modulator along a single path. In single-mode conduction, the time delay for transmission through the fiber is equal to the length of the fiber divided by the speed of light in the fiber. However, the speed of light in the fiber typically varies with the wavelength of the light. This phenomenon is known as "optical dispersion." The modulation applied by the transmitter inherently causes some variation in the wavelength.

Moreover, the emitting element of the transmitter may introduce additional variation in wavelength with time. The variation in wavelength with time is referred to as "chirp". Chirp typically is characterized by a chirp coefficient alpha ($\alpha$). If the wavelength decreases progressively with time, a has a positive sign. If the wavelength increases progressively with time, a has a negative sign. The magnitude of a represents the rate of increase or decrease.

The interaction between chirp and optical dispersion can introduce distortion into the transmitted signal. For example, if the wavelength changes progressively during emission of a pulse of light, optical dispersion will cause the light constituting different portions of the pulse to travel at different speeds. If the light emitted at the beginning of the pulse travels faster than the light emitted at the end of the pulse, the pulse of light arriving at the receiver will have a longer duration than the pulse emitted by the transmitter. For example, in a PAM modulation scheme, light emitted by the transmitter during one interval can arrive at the receiver at the same time as light emitted by the transmitter during the next interval. This effectively reduces the distinction between the different light levels emitted during the various intervals in a PAM modulation scheme. The adverse effects of distortion caused by chirp are becoming more significant as the speed of data transmission increases.

In one method of measuring chirp, a network analyzer is connected directly to the light emitter so that the analyzer can apply an analog signal such as a pure sinusoidal waveform modulating signal directly to the emitter. The emitter is connected to a photodetector through a fiber having known optical dispersion. The photodetector is connected to the network analyzer, so that the photodetector feeds an analog response signal back to the network analyzer. The network analyzer progressively varies or sweeps the frequency of the modulating signal applied to the emitter, and records the magnitude of the response signal at each modulation frequency. Plotting the magnitude of the response signal against the modulation frequency yields a pattern with distinct, sharp minima or "nulls" at particular modulation frequencies. The frequencies where these nulls occur vary with the chirp of the emitter, so that the chirp can be calculated from the frequencies where the nulls occur.

The frequency-sweeping method suffers from several serious drawbacks. Typical transmitters used in optical communications systems include the light emitter and modulator packaged together with the translation circuit, as, for example, in a single chip or small module. It is very difficult or impossible to apply the analog electronic signal from the network analyzer to the light emitter. It is normally impossible to apply a modulation signal with varying modulation frequency through the translation circuit of the transmitter. The translation circuit typically is arranged to operate at a single fixed clock rate or at a few selectable clock rates.

In another method of chirp measurement, the light output from a transmitter is directed into an optical instrument known as a Fabray-Perot resonator so that the chirp can be measured directly. This approach can be used to measure chirp when the emitter is actuated by the translation circuit of the transmitter. However, the cost, complexity and lack of portability of the instruments required for this method make it impractical for use in a data center environment.

SUMMARY

One aspect of the present disclosure provides a method of measuring chirp. A method according to this aspect includes actuating an emitter to emit light and modulating the emitted light, and also includes the modulated light through a variable dispersion element and measuring a parameter representing the strength of the modulation in the light after passage through the variable dispersion element. For example, the parameter may be the peak intensity of the modulated light. The method includes varying the dispersion applied by the variable dispersion element. The method further includes determining one or more dispersions which yield one or more minima; maxima; or minima and maxima of the measured parameter, and determining the emitter chirp based on these dispersions. The light may be amplitude modulated at a fixed modulation frequency, and the modulation may include a non-sinusoidal modulation as, for example modulation to different ones of a set of discrete amplitudes in sequence so that a series of discrete amplitudes recurs at the modulation frequency. As further discussed below, modulation of this type can be formed readily by actuating the translation circuit of common transmitters. Thus, the chirp of a transmitter incorporating a translation circuit together with an emitter and a modulator can be measured readily without accessing internal components within the transmitter. Methods according to some examples can be applied in routine testing such as in testing transmitters used in data centers.

A further aspect of the present disclosure provides apparatus for measuring chirp in modulated light. The apparatus according to this aspect includes a variable dispersion element adapted to receive the modulated light and apply a variable dispersion to the modulated light, a photodetector connected to receive the modulated light and provide a signal representing the modulation; and a signal processing circuit operative to measure a parameter representing strength of the modulation in the signal. The apparatus may further include an emitter and modulator connected to an input of the variable dispersion element, and a modulation signal source connected to the emitter and modulator. The modulation signal source may be adapted to supply a set of discrete values in recurring sequence to the emitter and modulator, so that the modulated light includes a recurring series of discrete amplitudes. For example, the emitter and modulator may be elements of a transmitter.

BRIEF DESCRIPTION OF THE DRAWINGS

FIG. 11 is a flow diagram illustrating an example method according to aspects of the disclosure.

DETAILED DESCRIPTION

Figure 1:
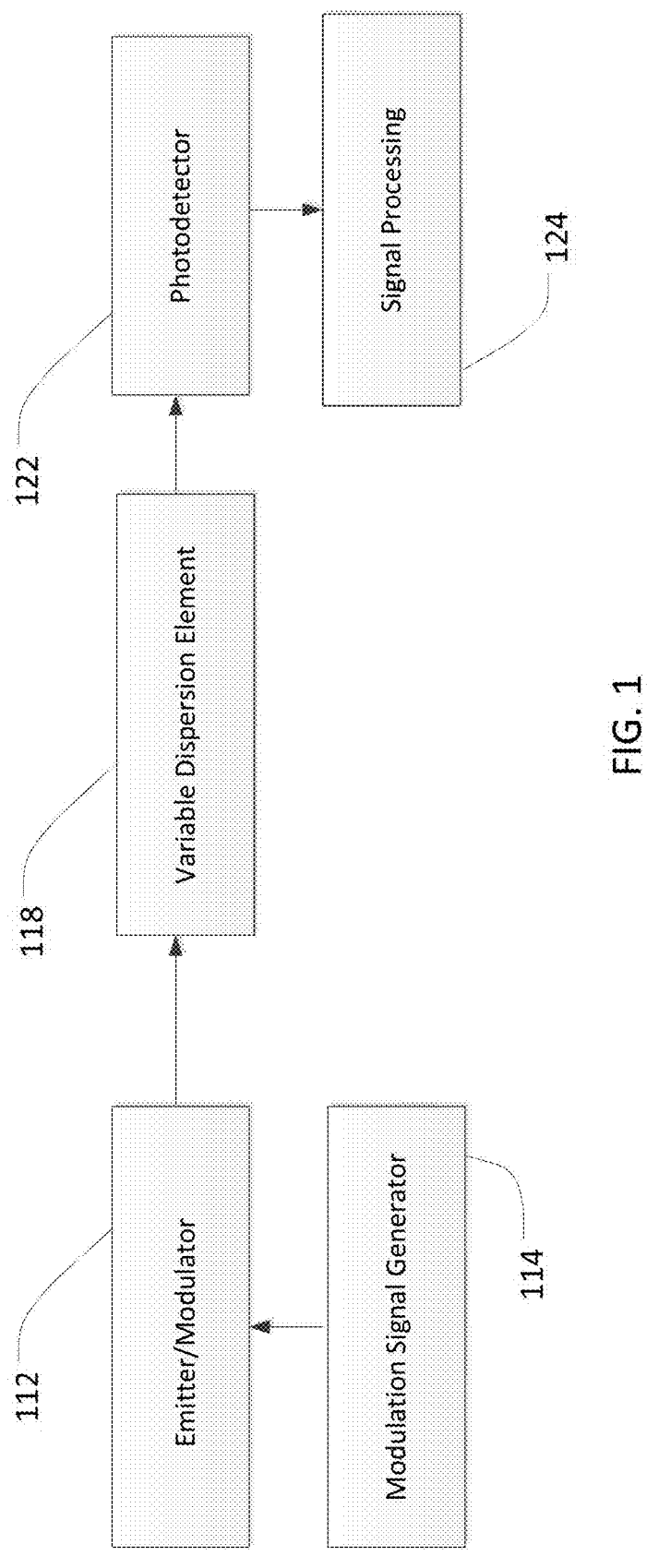
FIG. 1 is a diagrammatic view depicting apparatus according to one aspect of the present disclosure.

FIG. 1 illustrates an apparatus that may be used in one method of measuring chirp according to the present disclosure. The apparatus includes a signal generator 114 connected to an emitter and modulator 112 which is the device under test or "DUT". In this example, the emitter and modulator is arranged to modulate the amplitude of the emitted light in accordance with the modulation signal from the signal generator, and the signal generator is arranged to emit a sinusoidal signal at a fixed frequency. The frequency is of the same order of magnitude as the frequency of the modulation signals which will be applied to the DUT in service. For example, where the DUT will be operated at GHz frequencies, the modulation signal used in chirp measurement can also be in the GHz range. The light output by the DUT is connected to the light input of a variable dispersion optical element ("VDE") 118. The VDE is adapted to apply known dispersion values to the light passing through it, and to vary the known dispersions in response to user input.

VDEs are commonly used as tunable dispersion compensators, and can include elements such as microelectromechanical systems, Gires-Tournois etalons, fiber Bragg grating, wave-length-grating router, virtually imaged phased arrays, and an array of fibers with various dispersions. A photodetector 122 is connected to the output of VDE 118. The photodetector produces an analog electrical signal corresponding to the amplitude of the light from the VDE. A signal processor 124 measures a parameter such as the peak intensity of the modulated light. The measured parameter represents the signal strength of the modulation in the light reaching photodetector 122.

Figure 4:
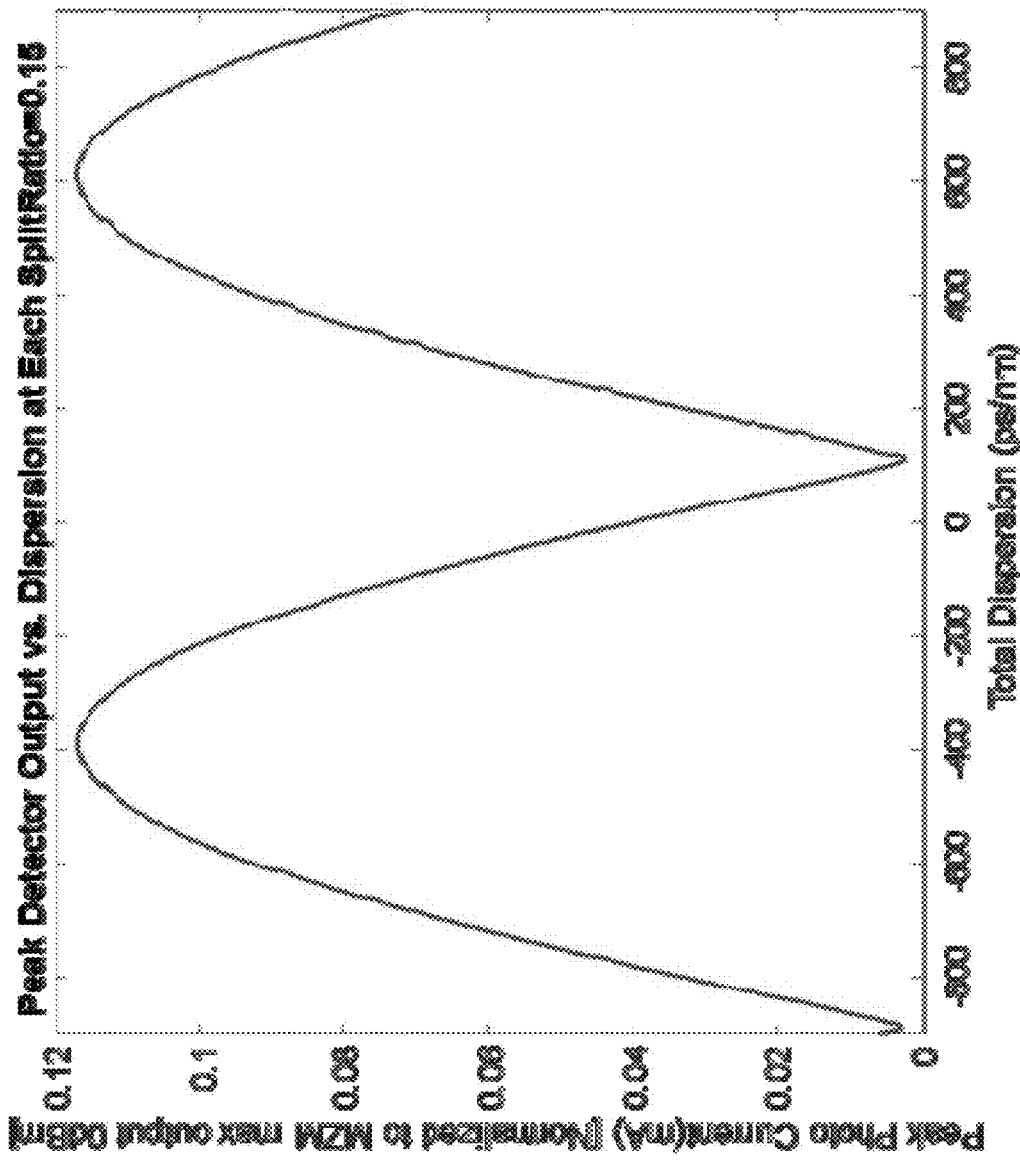
FIGS. 4, 5, 6 are graphs depicting variation of a parameter with dispersion in simulation of one measurement under different operating conditions.
Figure 5:
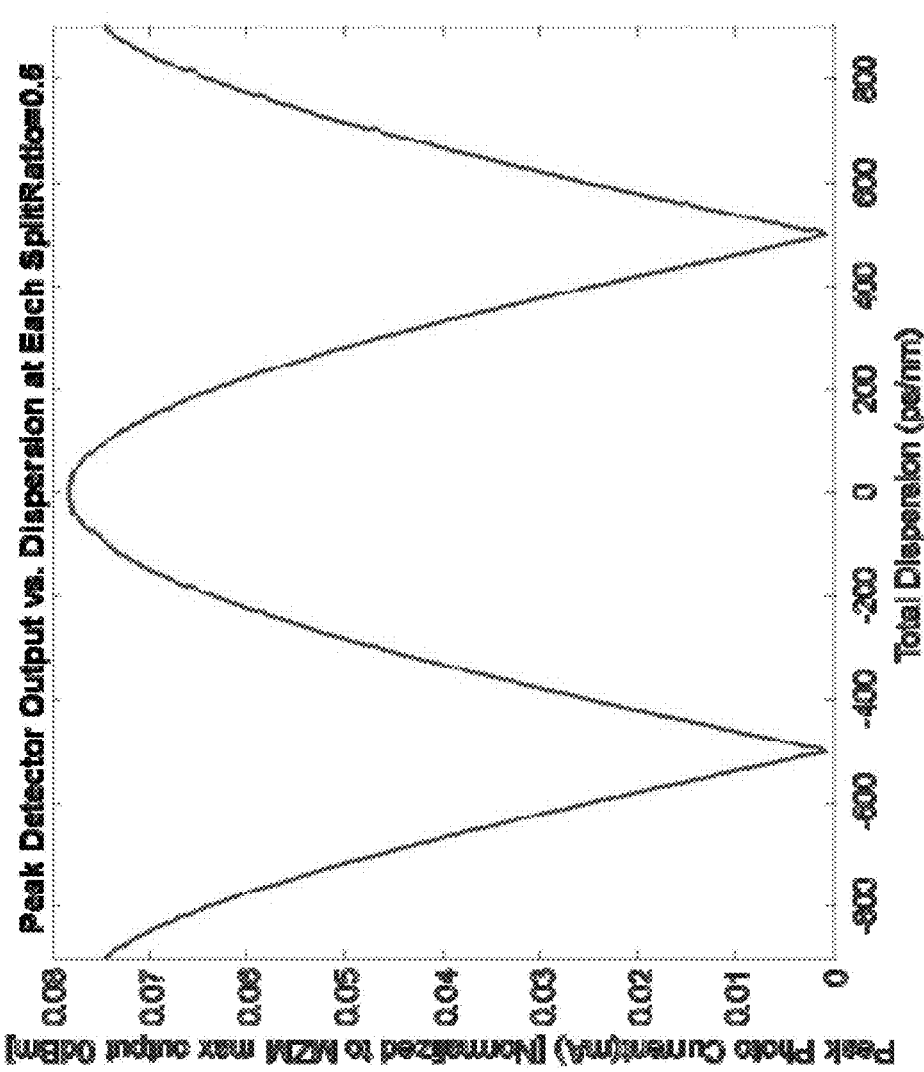
Figure 6:
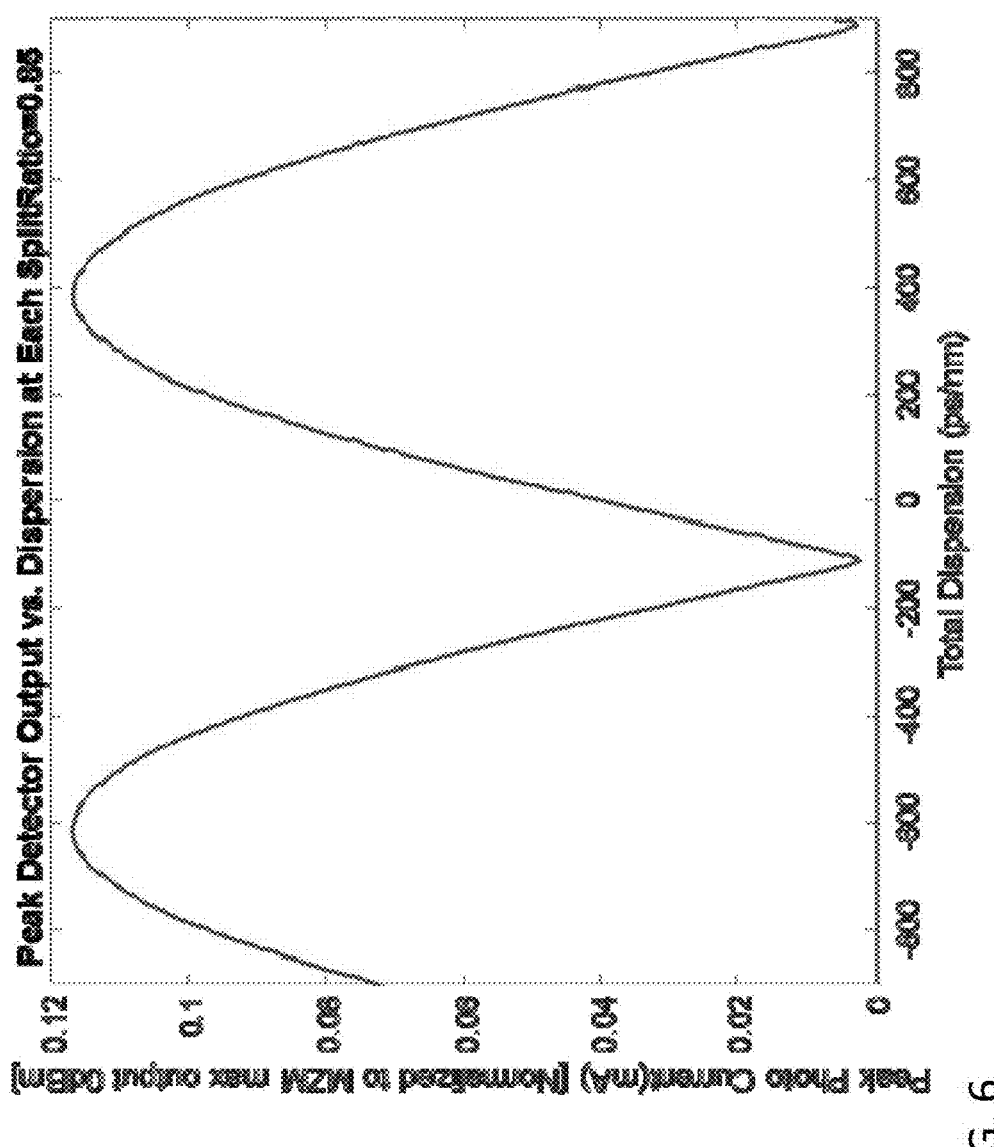

In operation during a method according to one example of the present disclosure, the modulation signal is maintained at a constant frequency, while the VDE is adjusted to vary the dispersion. The measured signal strength at the modulation frequency is plotted against the dispersion. The plot of the measured signal strength versus dispersion shows distinct maxima and minima at particular values of dispersion as shown at FIGS. 4-6 below. The chirp parameter alpha (α) can be calculated from the values of dispersion where the minima occur; the values where the maxima occur, or both. Most typically, a is calculated from the values where the minima occur as follows:

Alpha values can be derived with the equation below, from the known modulation signal frequency f, the minima VDE dispersion D and its corresponding minima position count u (0,1,2 . . . ), the light wavelength λ and the constant of the speed of light in vacuum c. An example formula for deriving the chirp parameter alpha can be as follows:

$$\alpha = \tan\left(\frac{\pi}{2}\left(1 + 2u - \frac{2Df^2\lambda^2}{c}\right)\right)$$

Figure 2:
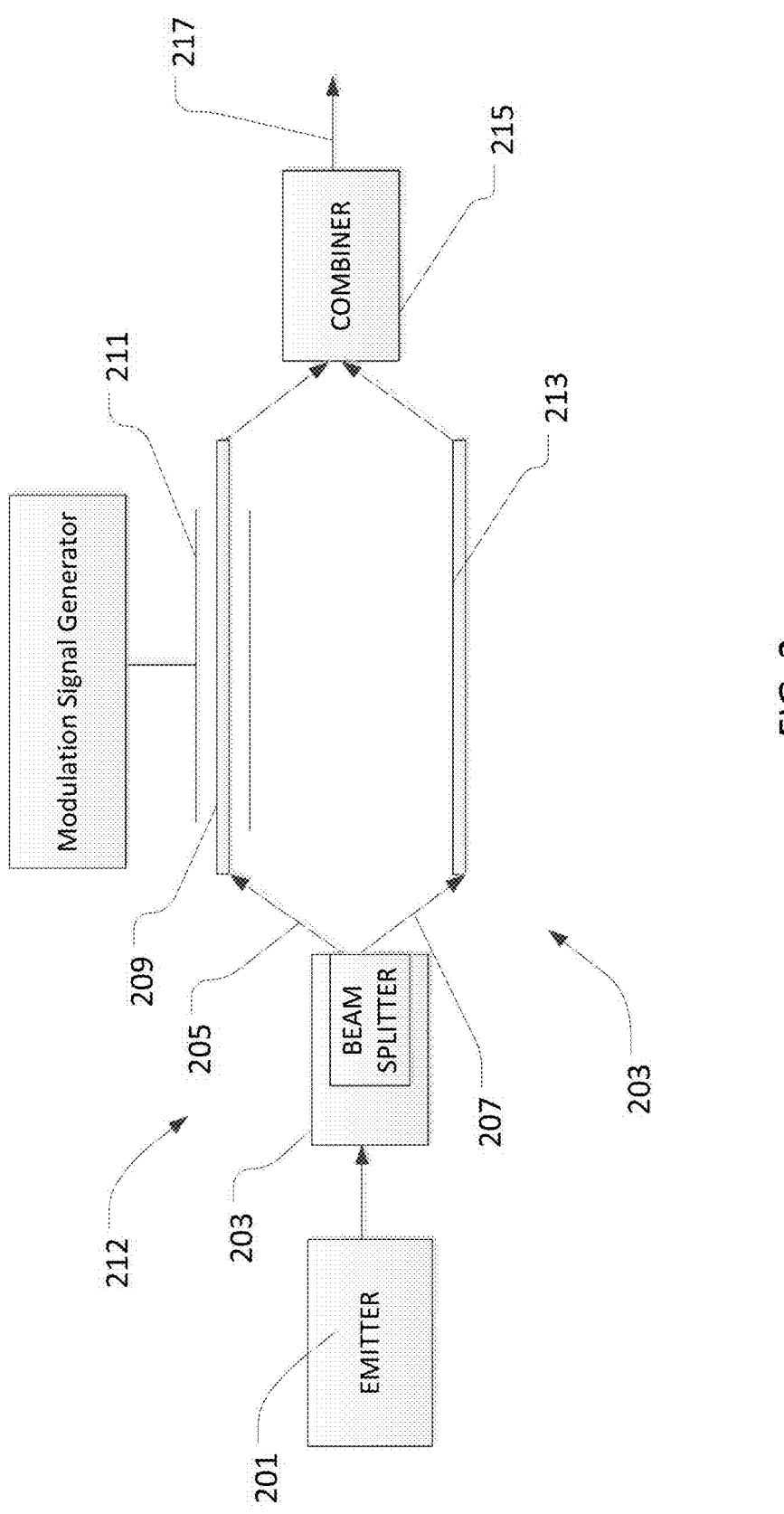
FIG. 2 is a diagrammatic view of an example modulator.

FIG. 2 illustrates an emitter and modulator 212 used as the device under test (DUT) to obtain the results with the method. The emitter and modulator use a continuous emitter 201 coupled to a quadratic-point-based Mach-Zender modulator 203. Modulator 203 includes a beam splitter which splits the incoming light beam from emitter 201 into a first beam 205 and a second beam 207.

The beam splitter is controllable so as to vary the portion of the optical power in the incoming beam directed into the first beam 205. The ratio of power directed into the first beam to power of the incoming beam is referred to herein as the "split ratio." The first beam passes along a first single-mode optical waveguide 209 formed from a material which exhibits a substantial electro-optical effect, i.e., variation index of refraction with applied electrical voltage. The modulation signal is applied as a voltage on electrodes 211 in proximity to the first waveguide 209. Thus, the index of refraction, and hence the speed of light in the first waveguide varies with the modulation signal. The second beam 207 passes through a second waveguide 213 which is identical to the first waveguide but which is not subject to the modulation signal.

Figure 3:
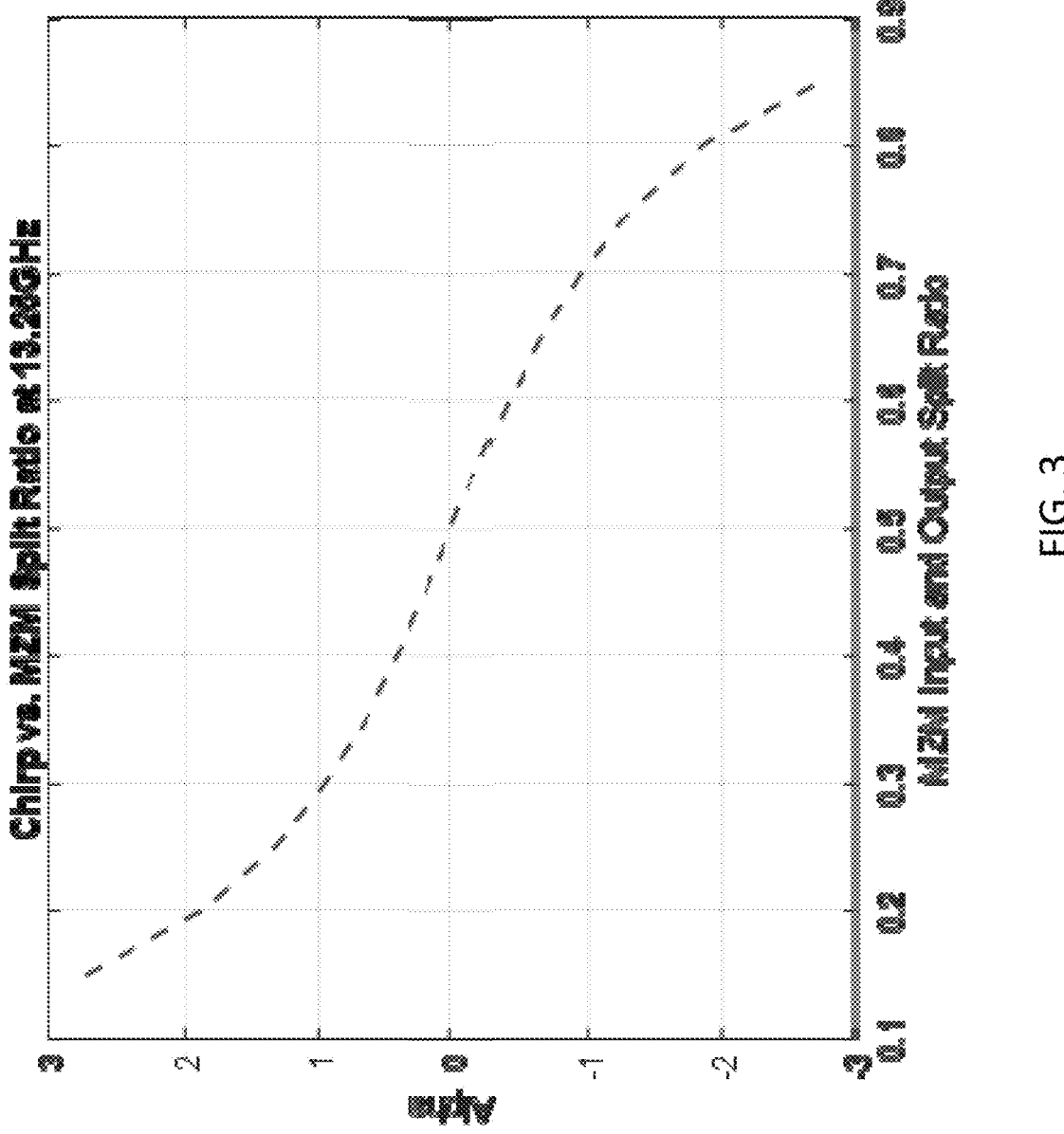
FIG. 3 is a graph depicting chirps of the modulator shown in FIG. 2.

The two beams pass from the waveguides into a combiner 215 to form an outgoing beam 217. When the voltage on electrodes 211 is zero, the two beams 205 and 207 take the same time to reach combiner 215, and thus are in phase with one another and constructively reinforce one another, so that the outgoing beam 217 has substantially the same power as the incoming beam from emitter 201. As the voltage on the electrodes increases, the first beam is delayed relative to the second beam, so that the two beams are out of phase as they reach the combiner, so that the beams begin to interfere destructively and the power in output beam is reduced. Thus, the power in the output beam varies with the modulation signal. This modulation process introduces chirp into the output beam. The chirp coefficient α and other properties of the emitted beam, such as its variation in intensity with time, are calculable using known methods. The calculated chirp coefficient varies with the split ratio of the modulator as shown in FIG. 3.

In simulations, the results for the measurement method discussed above with reference to FIG. 1, using the emitter and using the modulator of FIG. 2 as the DUT, are predicted and compared with the calculated chirp coefficient. A first simulation uses a relatively small sinusoidal modulating signal of 0.1 $V_{pi}$ applied to the modulator which is biased at the quadrature point. Under these conditions, the intensity of the output beam varies almost exactly sinusoidally. At a split ratio of 0.15, the simulation indicates that the peak intensity of the output beam, and hence the peak intensity measured by the signal processing circuit 124, will vary as shown in FIG. 4. The predicted minima of the peak intensity occur at dispersions of approximately +100 ps/nm and approximately −900 ps/nm, with maxima between these values. The value of the chirp coefficient calculated from these values is 2.76, exactly equal to the calculated value of the chirp coefficient for the 0.15 split ratio. At a split ratio of 0.5, the predicted variation of the peak intensity with dispersion is as shown in FIG. 5, with predicted minima at approximately −450 ps/nm and +450 ps/nm. These values yield a chirp coefficient of 0, again exactly corresponding to the predicted chirp coefficient as shown in FIG. 3. At a split ratio of 0.85, the predicted minima of the peak intensity occur at dispersions of about −100 ps/nm and +900 ps/nm, as shown in FIG. 6. These values correspond to a chirp coefficient of −2.76, again exactly equal to the calculated chirp coefficient of the modulator as shown in FIG. 3.

Figure 7:
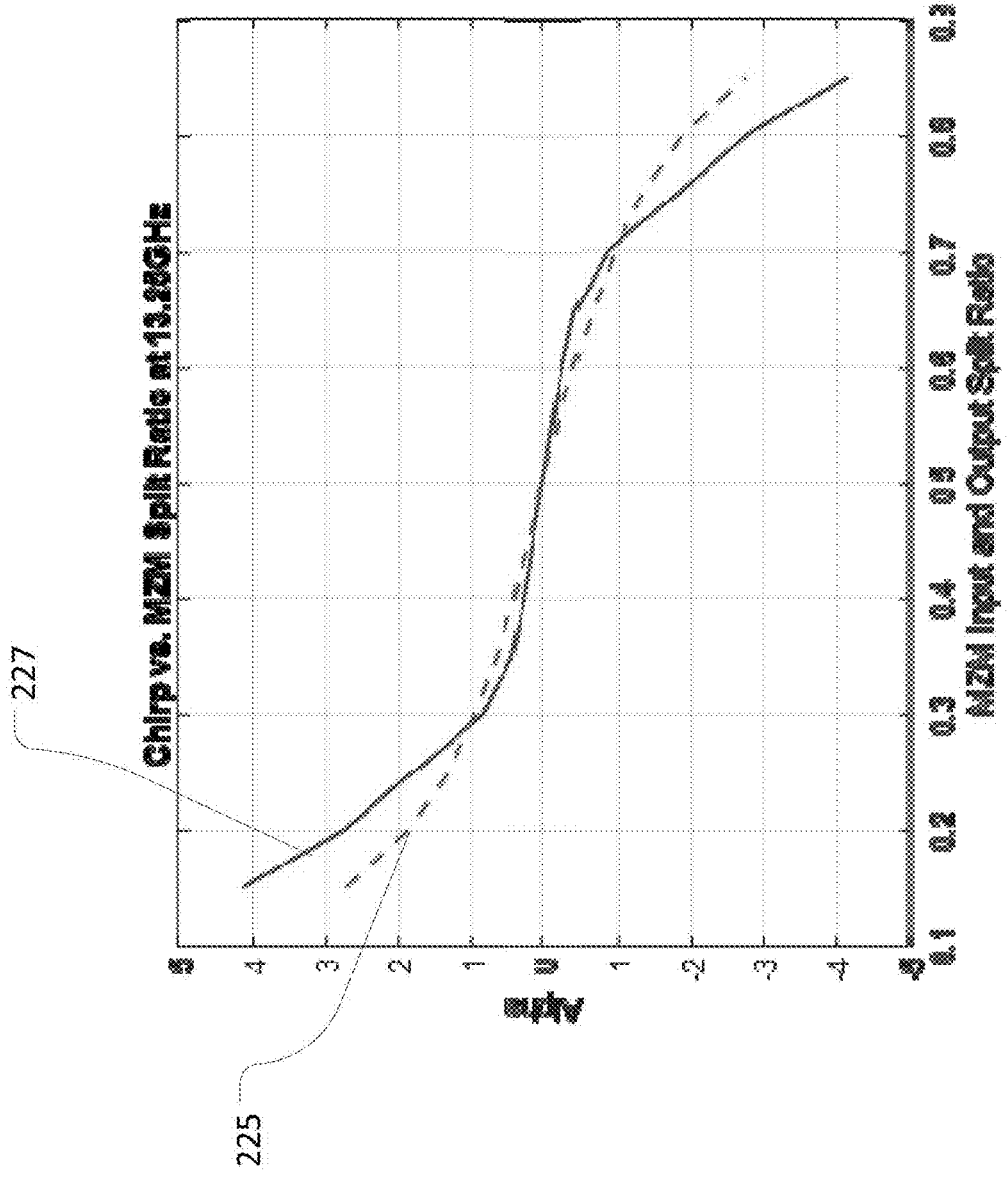
FIG. 7 is a graph depicting predicted results for measurements of chirp in a simulation using a large sinusoidal modulation signal of 0.9 $V_{pi}$.

A second simulation is conducted for a larger sinusoidal modulating signal, sufficient to vary the intensity of the output light beam between about 1.0 and about 0.15 times full intensity. With this large modulating signal, the intensity of the output beam from the modulator varies as a slightly distorted sinusoid. With this slightly non-sinusoidal modulation, the pattern of variation in the peak intensity versus dispersion, i.e., the predicted values of the measurements which would be obtained, are similar to those in the first simulation but not exactly the same. Here again, the dispersion values associated with the minima in the predicted peak intensity are used to determine predicted values of the measured chirp coefficient. The results are as shown in FIG. 7. In this figure, the calculated chirp coefficient of the modulator at various split ratios is shown by broken line 225; this is the same as the curve of FIG. 3. The predicted values of the chirp coefficients which would be obtained from the measured minima in the peak intensity are indicated by solid line curve 227. These results indicate that some errors in measurement would be introduced by the non-sinusoidal modulation of the beam intensity. Despite these errors, the chirp coefficient obtained from the measured minima in the peak intensity still provides a reasonably accurate value of the chirp coefficient.

Figure 8:
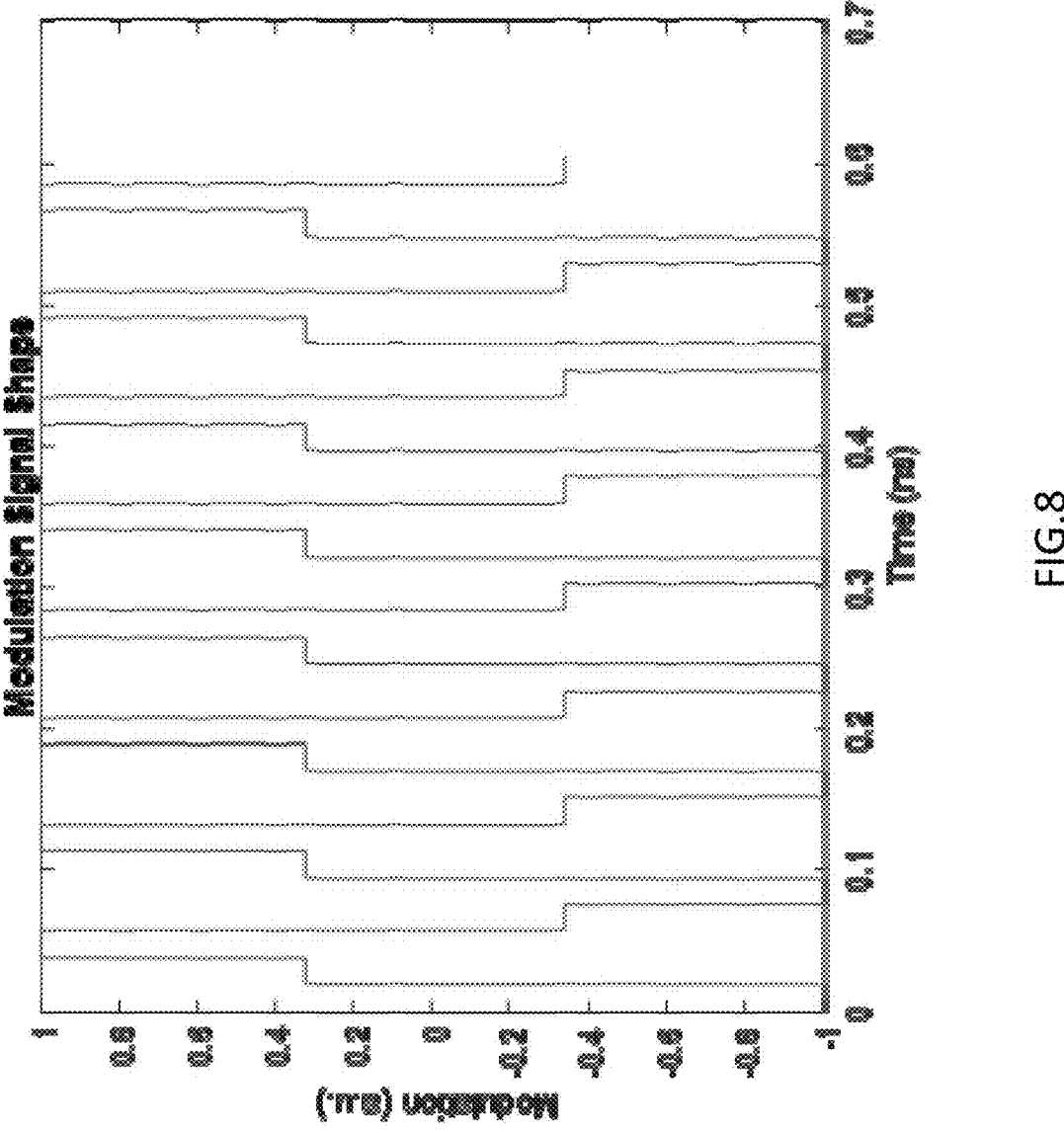
FIG. 8 is a graph depicting an example of non-sinusoidal modulation signals.
Figure 9:
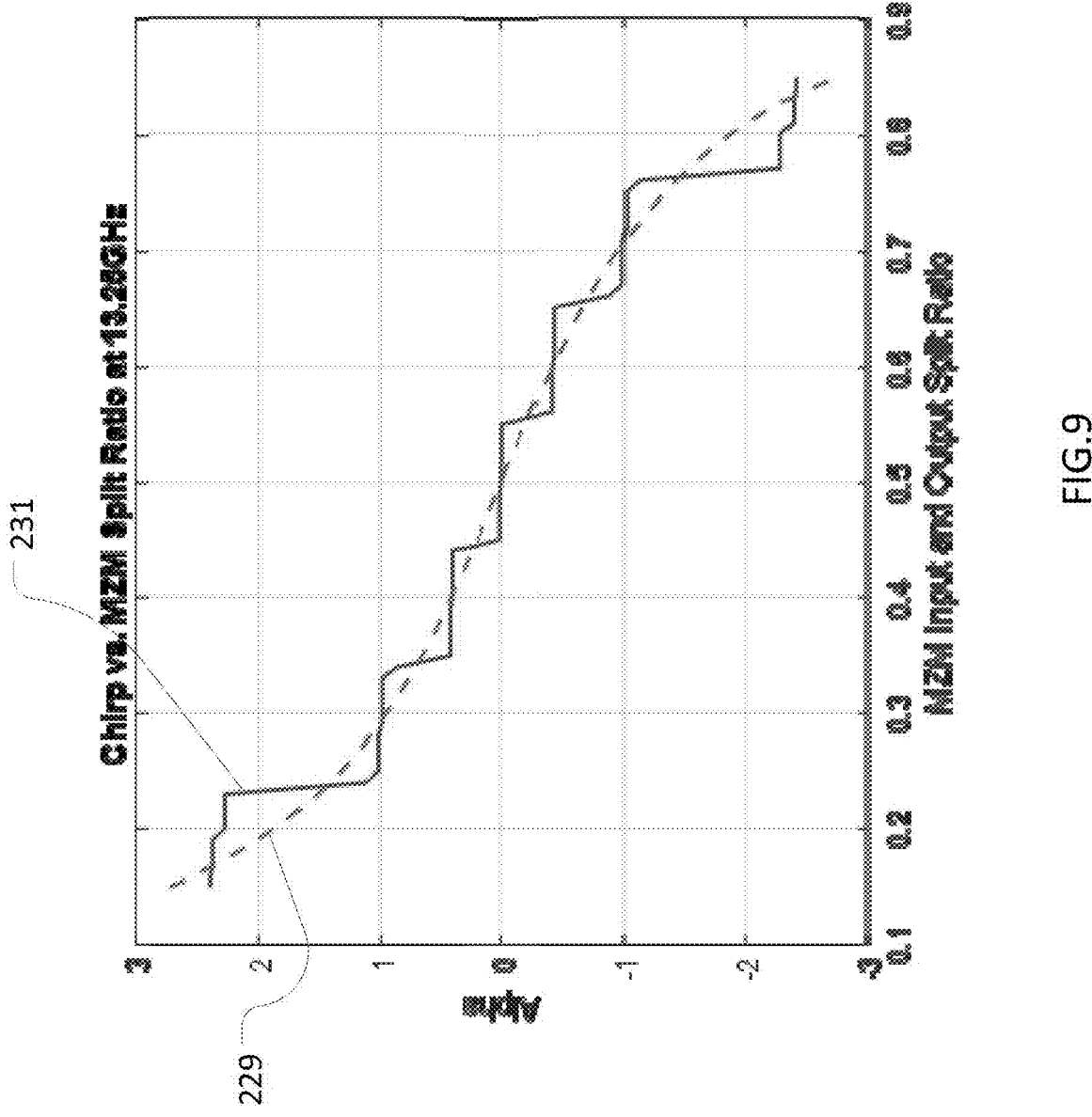
FIG. 9 is a graph depicting predicted results for measurements of chirp in a simulation using the modulation signal of FIG. 8.

A third simulation was conducted using a decidedly non-sinusoidal modulation signal of 0.1 $V_{pi}$, as depicted in FIG. 8. This signal includes a repetitive 4-PAM sequence of four discrete voltages. These voltages are represented by the horizontal lines in FIG. 8. There are brief transitions between succeeding intervals, as represented by the sloping lines. In this simulation, the sequence repeats at a fundamental modulation frequency of 13.25 GHZ. The results are as shown in FIG. 9. In this figure, the calculated chirp coefficient of the modulator at various split ratios is shown by broken line 229; this is the same as the curve of FIG. 3. The predicted values of the chirp coefficients which would be obtained from the measured minima in the peak intensity are indicated by solid line curve 231. Here again, the results indicate that some errors in measurement would be introduced by the non-sinusoidal modulation of the beam intensity. Despite these errors, the chirp coefficient obtained from the measured minima in the peak intensity would still provide a measure of the chirp coefficient which is useful for some purposes as, for example, as a quality assurance check to determine if an emitter has a reasonable range of chirp values.

In the simulations discussed above, the peak intensity of the light beam is used as a measure of the signal strength at the modulation frequency. The errors in measurement discussed above with reference to FIGS. 7 and 9 are caused by spurious signal components at frequencies higher than the modulation frequency which are incorporated into the modulated beam when the beam is modulated by a non-sinusoidal signal. These components can be suppressed by filtering the intensity signal from the photodetector, or at the DUT, using an analog or digital filter to remove components having frequencies above the modulation frequency before measuring the peak intensity.

Figure 10:
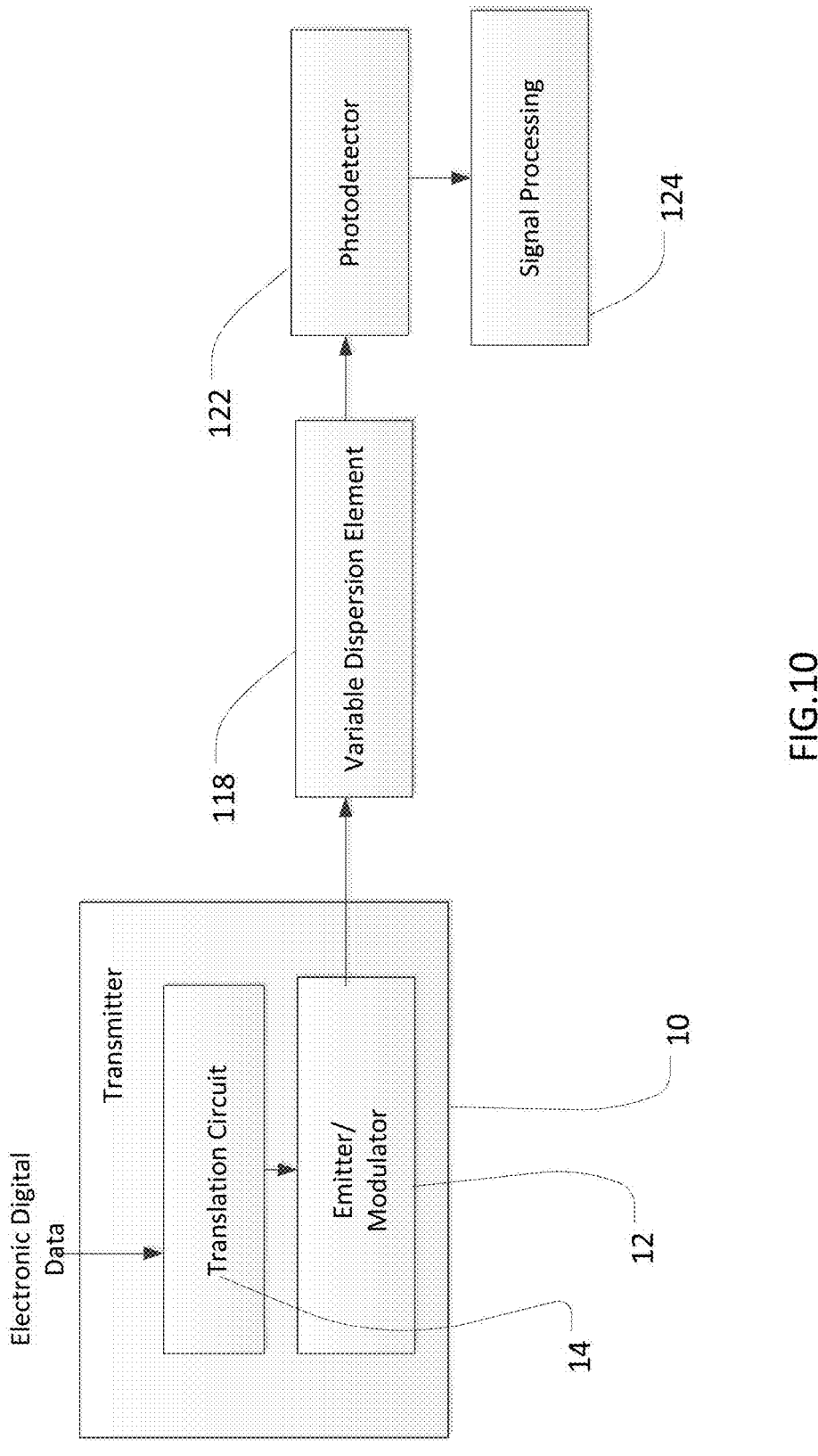
FIG. 10 is a diagrammatic view depicting apparatus according to a further aspect of the disclosure.

As discussed above, the methods discussed above can be used to measure chirp in a light beam modulated by a non-sinusoidal modulation signal having a constant modulation frequency. In a method according to a further example, schematically depicted in FIG. 10. The translation circuit is arranged to encode digital data into four signal levels (A) through (D) as discussed above in connection with FIG. 8. For example, the translation circuit may be arranged to encode data as follows:

| Digital Data (Binary) | Signal Level as Shown In FIG. 8 |
|---|---|
| 00 | A |
| 01 | B |
| 10 | C |
| 11 | D |

The variable dispersion element 118, photodetector 122 and signal processing circuits are as discussed above with reference to FIG. 1. The modulation signal is generated by repetitively providing the digital data sequence 00,10,11,01 to the translation circuit of the transmitter so that, during successive intervals, the modulation signal levels A,C,D,B repeat during successive intervals. This causes the emitter and modulator 122 to provide output light modulated as discussed above with reference to FIG. 8. The modulation frequency is one fourth the clock rate of the transmitter. Stated another way, the period of the modulation signal is equal to four signal intervals. Here again, the dispersion applied by VDE 118 is varied and a parameter representing the strength of the modulation at the modulation frequency in the light arriving at photodetector 122, such as the peak intensity, is measured. Here again, the chirp of the emitter and modulator is determined from the pattern of variation in this parameter, such as the dispersions associated with minima in the parameter.

Because the method can measure the chirp in a transmitter as such using a digital signal applied to the digital signal input of the transmitter, this method can be used readily to measure chirp without the difficult or impossible task of disassembling the transmitter to route an analog test signal to the emitter and modulator. The method thus greatly simplifies chirp measurement, particularly in settings such as data centers and quality assurance laboratories.

In a variant of this method, the transmitter may include software or hardware features which cause the transmitter to enter a chirp-test mode in response to a command. In the test mode, the translation circuit applies the repeating sequence of modulation signal levels discussed above without any input of digital data to the translation circuit.

The method discussed above with reference to FIG. 10 uses a 4-PAM transmitter to provide a repeating sequence of modulation levels. The number of modulation levels can be varied. For example, an 8-PAM transmitter may use a repeating sequence of 8 modulation levels. In this case, the modulation signal more closely resembles a sinusoid, so that errors caused by spurious high frequency components in the modulation signal are reduced. In a further variation, where the transmitter is arranged to enter a test mode, the translation circuit may use more signal levels during test mode than in normal operation. For example, a translation circuit which normally uses 4 levels in a 4-PAM scheme may use eight levels during test mode.

FIG. 11 illustrates an example method of measuring chirp according to aspects of the disclosure. While the operations are described in a particular order, it should be understood that the operations may be performed in a different order or simultaneously. Moreover, operations may be added or omitted.

In block 1110, the emitter emits light according to the modulation signal generated by the signal generator, and the modulator modulates the emitted light. In block 1120, the modulated light passes through the VDE and a signal processor measures a parameter that represents the modulation strength of the light after it has passed through the VDE. In block 1130, the VDE is adapted to apply a known dispersion to light passing through it, and to vary the known dispersion in response to user input. By analyzing the plot of the measured signal strength versus dispersion, distinct minima and maxima can be determined at specific dispersion values in block 1140. In block 1150, the emitter chirp can be determined based on the dispersion values corresponding to the minima, while the maxima indicate other relevant values.

The receiver normally used in a digital communication circuit incorporates a photodetector and a signal processing circuit. Where the signal processing circuit of the receiver is capable of capturing a parameter representing the modulation strength, such as peak intensity values, the receiver can be used as the photodetector and signal processing circuit during the test method. In this instance, the method can be performed without any special test equipment other than the variable dispersion element.

In the methods discussed above, only a single modulation frequency is employed. The ability to conduct the test without varying the modulation frequency greatly simplifies the test, and makes it possible to test devices such as digital transmitters which operate at a fixed clock rate. However, in a further variant of the method, more than one modulation frequency can be used. For example, if a transmitter can operate at a plurality of clock rates, the chirp can be determined at each clock rate.

In the examples discussed above, the light is amplitude-modulated. The methods of the present disclosure can be applied to measurement of the chirp in systems where the light is phase-modulated or frequency-modulated, or some combination of such modulations. In these cases, the chirp test mode may require the DUT to be configured as amplitude-modulated, or the chirp calculation formula be adjusted accordingly.

As these and other variations and combinations of the features set forth above can be used, the foregoing description should be taken as illustrating, rather than as limiting, the scope of the present disclosure.

The invention claimed is:

1. An apparatus for measuring chirp in modulated light comprising:
   a modulation signal generator configured to generate modulated light at a constant modulation frequency;
   a variable dispersion element configured to receive the modulated light at the constant modulation frequency, apply a variable dispersion to the modulated light, and control the variable dispersion to the modulated light;
   a photodetector connected to receive the modulated light and provide a signal representing the modulated light; and
   a signal processing circuit operative to measure a parameter representing a strength of the modulated light in the signal.

2. The apparatus of claim 1, further comprising an emitter and modulator connected to the variable dispersion element.

3. The apparatus of claim 2, wherein the modulation signal generator is connected to the emitter and modulator.

4. The apparatus of claim 3, wherein the modulation signal generator is operative to modulate the light from the emitter and modulator to a series of discrete values recurring as the constant modulation frequency.

5. The apparatus of claim 3, wherein the emitter and modulator and the modulation signal generator are elements of a transmitter operative to receive a digital signal including a series of digital values and modulate the emitted light in accordance with the digital values.

* * * * *